Figure 1:
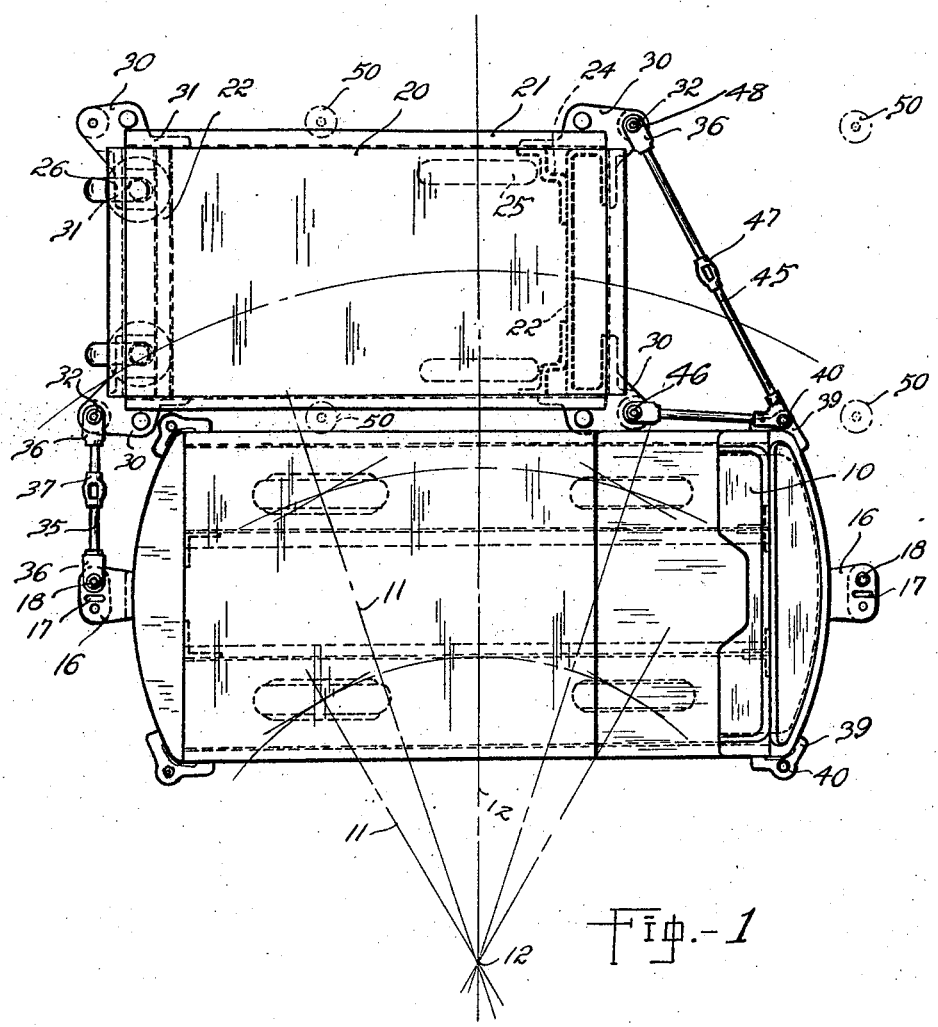

C. E. COCHRAN.
SIDE CAR ATTACHMENT.
APPLICATION FILED NOV. 15, 1920.

1,413,575.

Patented Apr. 25, 1922.
3 SHEETS—SHEET 1.

INVENTOR
Clyde E. Cochran
By Bakewell & Macklin,
Att'ys.

C. E. COCHRAN.
SIDE CAR ATTACHMENT
APPLICATION FILED NOV. 15, 1920.
1,413,575. Patented Apr. 25, 1922.
3 SHEETS—SHEET 2.
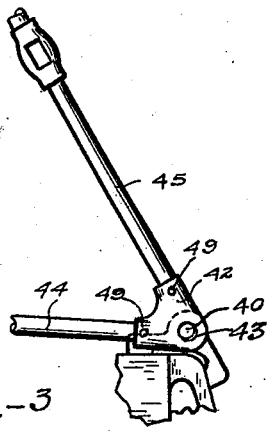
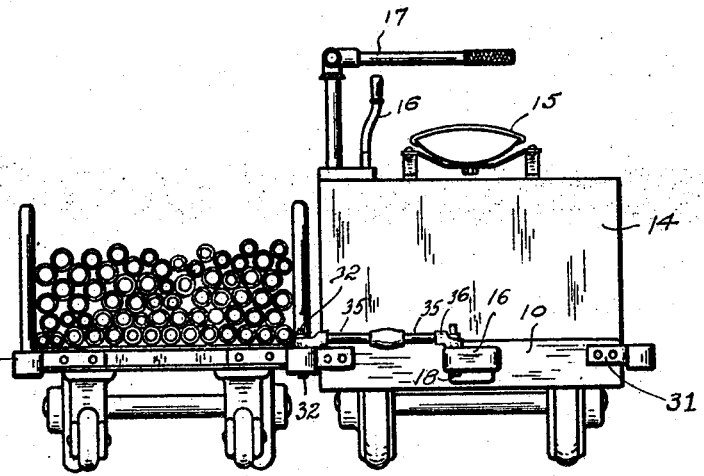

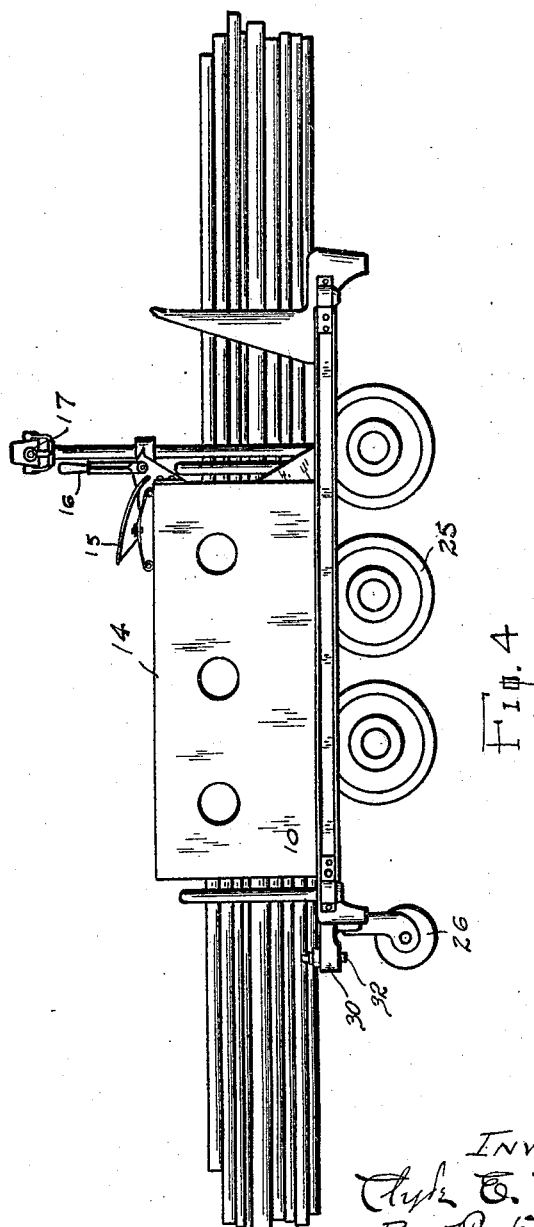

UNITED STATES PATENT OFFICE.

CLYDE E. COCHRAN, OF CLEVELAND, OHIO.

SIDE-CAR ATTACHMENT.

1,413,575.  Specification of Letters Patent.  Patented Apr. 25, 1922.

Application filed November 15, 1920. Serial No. 424,275.

*To all whom it may concern:*

Be it known that I, CLYDE E. COCHRAN, a citizen of the United States, residing at Cleveland, in the county of Cuyahoga and State of Ohio, have invented a certain new and useful Improvement in Side-Car Attachments, of which the following is a full, clear, and exact description, reference being had to the accompanying drawings.

This invention relates to means for transporting articles of merchandise. The general object of the invention is to provide a vehicle, such as a side car, which may be attached to a traction device.

A specific object of the invention is to provide a side car attachment for industrial trucks wherein the side car may be removed at will and placed upon either side of the truck. Another object of the invention is to provide in combination with an industrial truck a side car having a body adapted to receive and convey articles, the length of which is such that they could not be handled by the industrial truck. Further objects of the invention will be apparent as the description proceeds.

In the drawings, Fig. 1 is a top plan view of an industrial truck showing a side car attached thereto; Fig. 2 is an end elevation of the truck and side car; Fig. 3 is a fragmentary detail of a portion of the coupling means and Fig. 4 is a side elevation of the industrial truck showing the side car loaded.

Referring to the drawings, I have shown at 10 a tractor which may be of the type wherein all four wheels steer, and wherein the loci of the radii 11, about which the truck turns, lie along the line 12. The tractor 10 may be provided with the usual battery case 14, operator's seat 15, control 16 and steering mechanism 17. The side car is adapted to be used with any kind of vehicle and I do not wish to limit the use of my improvement to any particular type of propelling means.

In tractors of various types, it is inconvenient to place thereon articles having a length greater than the length of the tractor body. For instance, in handling pipes or other lengthy articles, it is impossible to place them lengthwise of the tractor and if a crosswise arrangement is attempted the space required to operate the truck is prohibitive. To overcome these defects and provide means whereby lengthy articles may be transported, I have provided a device, shown as a side car 20, which may have a frame, comprising longitudinal members 21, and transverse members 22. This frame, which may be provided with a suitable platform, is shown as mounted on a pair of front wheels 25 which may be upon a fixed axle. At the rear of the truck I provide a pair of caster wheels 26, which are adapted to train the front wheels and are adapted to turn freely about their support.

At the front and rear of the truck at each corner I provide brackets 30. These brackets may be cast metal and are shown as provided with flanges 31, adapted to fit the side car frame. The brackets may be alike and are shown as provided with pins 32 for a purpose to be described. The truck 10 may have couplers 16 thereon each provided with a coupling slot 17 and a pair of pins 18.

In order to secure the side car in operative position on the tractor, I may provide a fastening means for a rear bracket 30, which may include a pair of rods 35 each having one end provided with a coupling member 36 which has an aperture therein to receive the pins carried by the bracket and coupler. The ends of the rods 35 may be connected by a suitable means, shown as a turn buckle 37. If desired, the coupling member may be merely a rod or bar provided with an aperture in each end.

To secure the front end of the side car to the tractor, I provide a suitable means, shown as brackets 39, having pins 40 thereon. Co-operating with this bracket 39 I have shown a member 42 having an aperture 43 therein, which is adapted to fit over a pin 40. The member 42 may have a pair of rods 44 and 45 secured thereto by pins 49. The rod 44 is provided at one end with an eye 46 having an aperture therein, which aperture is adapted to receive the pin on a bracket 30.

The rod 45 may be provided with a turn buckle 47 intermediate its ends and the end opposite the bracket 39 is provided with an eye 48 having an aperture to receive the pin 32. It will thus be seen that I have provided means for quickly securing the side car to a tractor.

I have shown in Fig. 1 of the drawings that the axis of the front wheels 25 of the truck may be in a plane which passes through the locus 12 of the turning radii 11 of the wheels of the tractor. This is true when the side car is on either side of the truck and when it is reversed. This construction affords great ease in turning operation.

The side car 20 when attached, as shown in the drawings, is best adapted to operate with the truck going forward. If it is desired to operate the truck in a reverse direction the side car may be uncoupled and reversed and the connection made upon the other end from that shown in Fig. 1. In coupling the side car for reverse direction, as described, the brackets therein would occupy the position shown in dotted lines at 50. The side car may be positioned on either side of the tractor as desired. If coupled on the side opposite that shown in Fig. 1, the rods 44, 45, would merely be turned over to present the other side of the casting thereon for engagement with the brackets.

It will thus be seen that I have described a reversible truck attachment which allows lengthy loads to be moved with facility in narrow aisles, and that the attachment is simple, easy to couple up with the tractor, and is highly efficient.

Having thus described my invention I claim:—

1. The combination of a tractor and a side car and means to connect the side car to the tractor, said means being constructed and arranged so that the side car may be placed upon either side of the tractor, with the same end facing forwardly.

2. The combination of a tractor having a four wheel steer, and a side car, the axis of the front wheels of the side car being immovable with respect to the body thereof, the plane of said axis passing through the loci of the turning radii of the tractor.

3. A side car attachment for a tractor comprising a body part having a pair of wheels at one end thereof, the axis of which is fixed as regards said body, and a pair of wheels at the rear of said body, the axis of said last pair of wheels being movable independently of each other and of the body.

4. The combination of a tractor and a side car, said side car having bracket members at each of the four corners thereof, and means to connect a pair of the bracket members with the tractor body.

5. The combination of a tractor and a side car, said side car comprising a body part having a pair of wheels at one end thereof, the axis of which is fixed as regards said body, and a pair of wheels at the rear of said body, the axis of said last pair of wheels being movable independently of each other and of the body, and means to attach the side car to the tractor, said means comprising bracket members, one at each corner of the body.

6. In combination a tractor and a side car, the side car comprising a body part having a pair of wheels at each end thereof, the wheels of one pair being movable independently of each other and of the body, and means to attach the side car to the tractor, said means comprising pins carried by the body and tractor, and apertured coupling members adapted to engage the pins.

7. The combination of a tractor and a side car comprising a body part having supporting wheels, fastening means on the tractor and on the side car, coupling means to connect the fastening means, said fastening and coupling means being constructed and arranged so that the side car may be placed on either side of the truck, with the same end facing forwardly.

8. A side car attachment for a tractor comprising a body part having a pair of wheels at one end thereof, the axis of which is fixed as regards said body, and a pair of wheels at the rear of said body, the axis of said last pair of wheels being movable independently of each other and of the body, and means to attach the side car to a tractor.

9. The combination of a side car and a tractor, the side car comprising a body part having a pair of wheels at one end thereof, the axis of which is fixed as regards said body, and a pair of wheels at the rear of said body, the axis of said last mentioned wheels being movable independently of each other and of the body, and means to attach the side car to the tractor, said means comprising bracket members, one at each corner of the body, and additional means to connect three of the bracket members with the tractor body comprising apertured members adapted to engage projections upon the casting, certain of said connecting means being adjustable.

10. In combination, a side car and a tractor, the side car comprising a body part having a pair of wheels at one end thereof, the axis of which is fixed as regards said body, and a pair of wheels at the rear of said body, the axis of said last mentioned wheels being movable independently of each other and of the body, and means to attach the side car to the tractor, said means comprising bracket members, one at each corner of the body, and means to connect three of the bracket members with the tractor body.

11. The combination of a side car and a tractor, the side car comprising a body part having a pair of wheels at one end thereof, the axis of which is fixed as regards said body, and a pair of wheels at the rear of said body, the axis of said last mentioned wheels being movable independently of each other and of the body, and means to attach the side car to the tractor, said means comprising bracket members, one at each corner of the body, and additional means to connect three of the bracket members with the tractor body comprising apertured members adapted to engage projections upon a casting attached to the tractor, said means being constructed and arranged to couple the side car on either side of the tractor.

12. The combination of a tractor having a four-wheel steer, and a side car, the axis of the front wheels of the side car being immovable with respect to the locus of the turning radii of the tractor.

13. A side car attachment for a tractor comprising a body part having a pair of wheels, and means whereby the side car may be attached to the tractor with the axis of said wheels coincident with the locus of the turning radii of the tractor.

14. The combination of a tractor and a side car, and means to connect the side car to either side of the tractor whereby one wheel axis of the side car may be maintained coincident with the locus of the turning radii of the tractor when said side car is attached to either side of the tractor.

In testimony whereof, I hereunto affix my signature.

CLYDE E. COCHRAN.

Witnesses:
F. J. Heiss,
L. I. Holt.